US011323500B1

(12) United States Patent
Liu et al.

(10) Patent No.: US 11,323,500 B1
(45) Date of Patent: May 3, 2022

(54) REMOTE MULTI-TARGET CLIENT MONITORING FOR STREAMING CONTENT

(71) Applicant: Conviva Inc., Foster City, CA (US)

(72) Inventors: Ming Liu, Foster City, CA (US); Weijia Li, Foster City, CA (US); Jibin Zhan, Foster City, CA (US); Ningning Hu, San Jose, CA (US)

(73) Assignee: Conviva Inc., Foster City, CA (US)

(*) Notice: Subject to any disclaimer, the term of this patent is extended or adjusted under 35 U.S.C. 154(b) by 633 days.

(21) Appl. No.: 16/031,743

(22) Filed: Jul. 10, 2018

Related U.S. Application Data

(60) Provisional application No. 62/664,810, filed on Apr. 30, 2018.

(51) Int. Cl.
H04L 29/06 (2006.01)
H04L 65/60 (2022.01)
H04L 65/612 (2022.01)
H04L 65/1023 (2022.01)

(52) U.S. Cl.
CPC ........ H04L 65/604 (2013.01); H04L 65/1023 (2013.01); H04L 65/4084 (2013.01); H04L 65/607 (2013.01); H04L 2209/603 (2013.01)

(58) Field of Classification Search
None
See application file for complete search history.

(56) References Cited

U.S. PATENT DOCUMENTS

2008/0046817 A1* 2/2008 Sharp .................... G06F 8/38
715/700
2014/0032531 A1* 1/2014 Ravi .................... H04M 15/51
707/722

* cited by examiner

Primary Examiner — Tan Doan
(74) Attorney, Agent, or Firm — Van Pelt, Yi & James LLP

(57) ABSTRACT

Remote multi-target client monitoring for streaming content is disclosed. Raw data generated within a remote client device is received from the client device. The raw data is associated with content playback. An adaptor is used to translate the raw data into a unified data model. The translating comprises determining, from the raw data, a designation of at least one of a start and an end of a monitoring session.

19 Claims, 15 Drawing Sheets

| Fields | |
|---|---|
| Unified Data Model | Raw |
| "protocolVersion" | X-Conviva-SDK-Version |
| "type":default value: CwsSessionHb | N/A – client can ignore. If needed, may be added on server |
| "customerId" | customers |
| "clientId" | devices |
| "InstanceId" | target_id |
| "sessionId" | N/A |
| "sessionTimeMs" | timestamp_ms |
| "seqNumber" | seq_num |
| "sessionStartTimeMs" | N/A |
| "sessionFlags" | N/A |
| "clientVersion" | app_version |
| "capabilities" | N/A |

FIG. 4A

| Platform Metadata | |
|---|---|
| "gen1" | schema |
| operating system name | system_name |
| operating system version | system_version |
| device type | system_device_type |
| device version (optional) | deviceVersion |
| device model (optional) | device_model |
| device manufacturer (optional) | deviceManufacturer |
| device brand (optional) | deviceManufacturer |
| framework name (optional) | framework |
| framework version (optional) | frameworkVersion |
| browser name (optional) | browserName(Safari) |
| browser version (optional) | N/A |
| platform name (optional) | X-Conviva-SDK-Platform |
| platform version (optional) | X-Conviva-SDK-Version |

FIG. 4B

| Optional Fields | |
|---|---|
| Unified Data Model | Raw |
| "isAdVideo" | The corresponding values for the videoType key should be live, adVideo, normalVideo |
| previous heartbeat infos | seq_num |
| "events": | item_list |
| tags: | Player metadata |
| "viewerId" | viewerId |
| "framework": | framework |
| "frameworkVersion" | frameworkVersion |
| "platform": | X-Conviva-SDK-Platform |
| "platformVersion": | X-Conviva-SDK-Version |
| "platformMetadata": | The field inside the platform metadata of the conviva data model can go into deviceinfo, appinfo, and event to inquire |
| "logs": | See ErrorEvent |
| "connectionType": | connectionType |
| "isSdkClient": | isSdkClient |
| "buffer length": | loadedTimeRanges |
| "player head time": | position |
| "fallback selection event count": | N/A |
| "Component config": | Configurations specific to the player platform |
| "Detected SSID": | wifiName |
| "CDN Server IP": | cdnServerIp |
| "Signal Strength": | signalStrength |
| "video width": | width |
| "video height": | height |
| "Link Encryption": | sha256 |
| "AdvertisingTrackingId" | idfa |
| "client configuration parameters": | cfg |

FIG. 4C

| Fields for Video Sessions ||
| --- | --- |
| Unified Data Model | Raw |
| "assetName": | assetName |
| "playerState": | Player state |
| "pauseJoin": | pauseJoin |

FIG. 4D

| Optional Fields for Video Sessions | |
| --- | --- |
| Unified Data Model | Raw |
| "resource": | resource |
| "cdnName": | cdnName |
| "contentLengthSec": | duration |
| "playerName": | playerName |
| "bitrateKbps": | estimatedDataRate |
| | |
| "encodedFps": | currentVideoFrameRate |
| | |
| "streamUrl": | url |
| "isLive": | The corresponding values for the videoType key should be live, adVideo, normalVideo |
| rfpscnt : | frameRateCount |
| rfpstot : | frameRateTotal |

FIG. 4E

| ErrorEvent ||
|---|---|
| Unified Data Model | Raw |
| "type": | Inside jsonvalue, when the status field's value is AVPlayer Status Failed, this indicates that there is an error event |
| "isFatal" | isFatal |
| "errorMsg": | errorMsg |
| "sessionTimeMs" | timestampms |
| "seqNumber": | seq_num |

FIG. 4F

| SeekEvent | |
|---|---|
| Unified Data Model | Raw |
| "type": | When the field seekToPosition is in jsonvalue, this indicates a seek event |
| play head time | position |
| "sessionTimeMs" | timestampms |
| seek to position | seekToPosition |

FIG. 4G

| CustomEvent ||
|---|---|
| Unified Data Model | Raw |
| "type": | target_type= custom_info |
| "seqNumber": | seq_num |
| attributes | json_value |
| "sessionTimeMs" | timestampms |
| play head time | position |

FIG. 4H

REMOTE MULTI-TARGET CLIENT MONITORING FOR STREAMING CONTENT

CROSS REFERENCE TO OTHER APPLICATIONS

This application claims priority to U.S. Provisional Patent Application No. 62/664,810 entitled REMOTE MULTI-TARGET CLIENT MONITORING FOR STREAMING CONTENT filed Apr. 30, 2018 which is incorporated herein by reference for all purposes.

BACKGROUND OF THE INVENTION

Users are increasingly using networks such as the Internet to access content, such as video files and live streaming/video on demand content, via client machines. Such content is often large, time sensitive, or both. As demand for such content increases, there are challenges in distributing that content efficiently and with high quality. As one example, with the various types of device and video players used in video streaming, keeping clients updated in a complex video streaming ecosystem can be challenging.

BRIEF DESCRIPTION OF THE DRAWINGS

Various embodiments of the invention are disclosed in the following detailed description and the accompanying drawings.

FIGS. 4A-4E illustrate example mappings of raw data to fields of the unified data model.

FIGS. 4F-4H illustrate example mappings of raw data to events of the unified data model.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for configurable, server-side monitoring of client-side targets. While example embodiments in a video streaming (e.g., live and on-demand streaming) ecosystem are described below, the techniques described herein can variously be adapted to accommodate any type of multimedia/audiovisual content distribution or delivery, as applicable.

Monitoring and Measurement of Streaming Sessions

Client Side Monitoring and Measurement

Figure 1A:
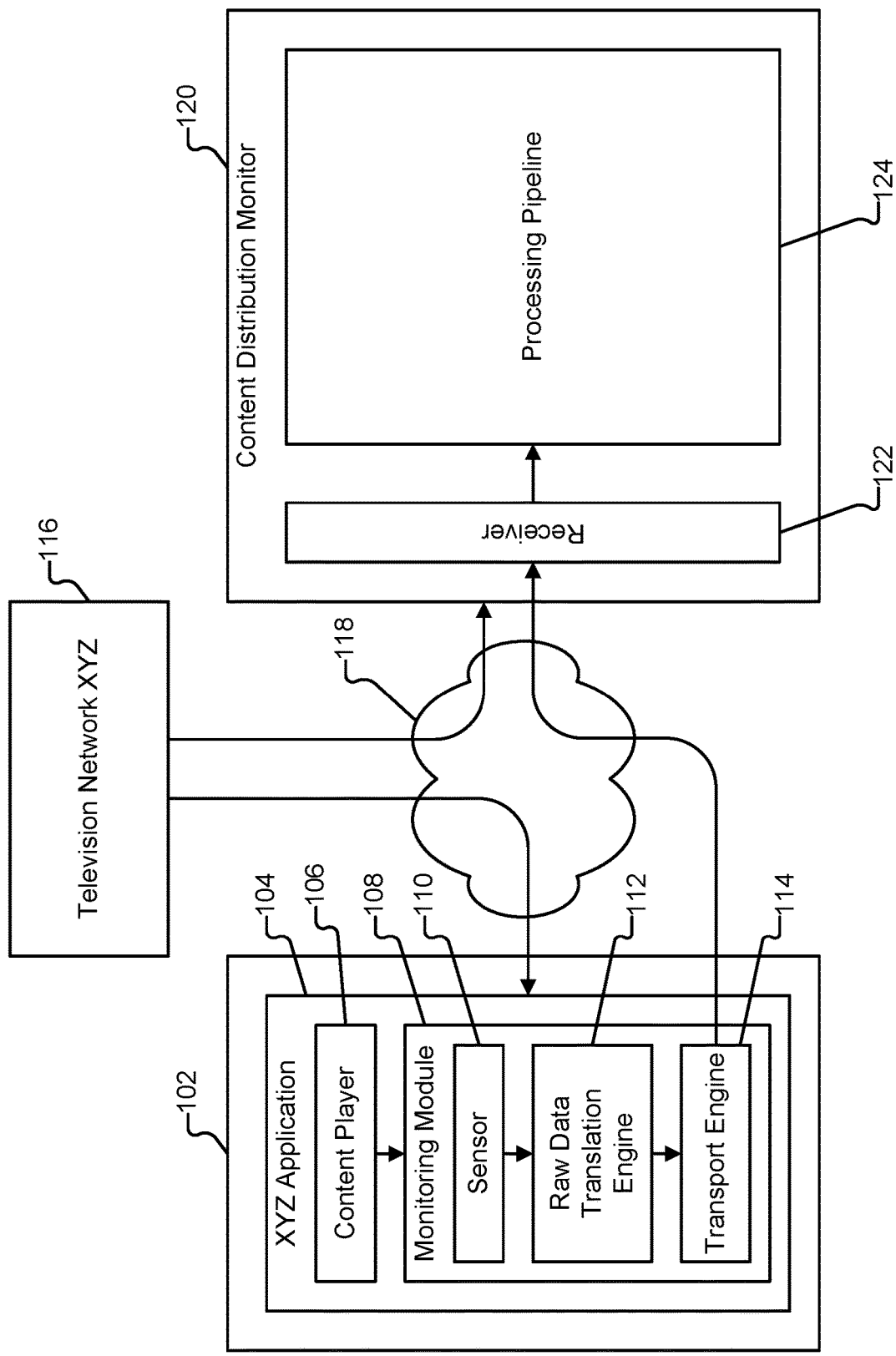
FIG. 1A illustrates an embodiment of an environment in which client-side monitoring and measurement is performed.

FIG. 1A illustrates an embodiment of an environment in which client-side monitoring and measurement is performed. In the example shown, client 102 is used to access content, such as audiovisual content (e.g., movies, songs, television shows, sporting events, games, images, etc.) that is owned by content owners. The content is stored (or captured) at origin servers, then distributed via other servers, caches, content distribution networks (CDNs), proxies, etc. (collectively, "content sources"). Content sources employ a variety of technologies and include HTTP, Adobe Flash Media, and Microsoft Internet Information Service services. In some embodiments, content is also distributed by clients (e.g., using peer-to-peer techniques).

Examples of clients include personal computers, laptops, cellular phones/personal digital assistants, and other types of information appliances such as set-top boxes, game consoles, broadband routers, file servers, video servers, and digital video recorders, as applicable. The clients are used by subscribers to various Internet service providers (ISPs).

In this example, suppose that client 102 is a smartphone device that has installed various mobile applications (also referred to herein as "apps"). Suppose that a user of client 102 would like to watch a television show published by television network ("XYZ") 116 (an example of a content publisher). The user of client 102 has installed, on their device, a video player application (104) for selecting and viewing streaming content published by a television network ("XYZ").

Via a user interface provided by video application 104, the user selects a television show (example of a content item) to watch. Client 102 includes a content player application 106, as well as a monitoring module 108. The requested content item is received by the content player from a content source such as a CDN (e.g., over network 118 such as the Internet). The content player then renders the content being streamed from the CDN as part of the content playback session. As used herein, a session refers to an entity representing an instance of the user's playback interactions with the content item or asset. The session may be defined in a variety of manners. As one example, the session may be designated as having begun with a user's request for a particular content, and end when the user ceases playing the content (e.g., the user stops watching a requested video). As another example, the session may be designated as having started when the video started playing.

Monitoring module 108 is configured to provide status information (also referred to herein as a "heartbeat") associated with the video streaming, on a recurring basis, to content distribution monitor 120.

The status information includes a variety of telemetry data such as information that captures the quality of the user experience (e.g., video stream quality), and information pertaining to user behavior. Examples of quality metrics include; the length of time it takes for the television show to start playing, the number of buffering events (if any), the length of buffering events, and the number of frames per second rendered by the video player. Examples of user behavior include: starting and stopping playing a video or audio stream, seeking within the stream, switching the player to full screen mode, minimizing/restoring the player, a change in the volume level of the player, and clicking on an advertisement.

In order to provide such status information, monitoring module 108 includes sensor 110, raw data translation engine 112, and transport engine 114. In some embodiments, monitoring module 108 is implemented as a library. Sensor 110 is configured to listen for and collect raw event data (as well as metadata and properties/attributes) from the content player. The raw event data is translated by raw data translation engine 112 into a unified or predefined data model. The raw data translation engine includes logic to determine, from raw data (e.g., events and attributes) collected by sensor 110, status information such as that described above. As one example, raw data provided by the content player can be used to infer the state of the player. For example, the unified data model may include a field for indicating player state (e.g., buffering, playing, paused, sleeping, etc.) during a session. However, suppose that the player itself does not provide an explicit indication of its player state. Nonetheless, the raw data translation engine is configured to translate (e.g., according to translation rules) raw events/attributes into a player state. For example, if the sensor receives an event from the player indicating that the player's buffer is full, then the raw data translation engine can use that raw event to infer that the player is playing video. As another example, if it was inferred that the player is currently in a paused state and the playhead time starts to move, then an inference is also made that the player has changed state to playing video. In addition to the player states, the raw data translation engine also determines various metrics (e.g., the number of bytes downloaded/streamed since the session started, the bitrate of the stream, and the rendering rate) from the raw events. As one example, the sensor can collect raw framerate data from the video player. The raw data translation engine may be configured to summarize the raw framerate data, collected over a period of time (e.g., over the course of a session), into an average framerate, which is another example of a field in the unified data model.

In some embodiments, the monitoring module is implemented as an API, where the client side library calls the APIs to perform certain functions. As one example, the developer of the library can code the library such that when an event such as video start occurs, then the API can be explicitly called to designate start and end of (monitoring of) session.

Transport engine 114 is configured to package the status information (in the unified data model) translated from the raw data into heartbeat messages, and then communicate the heartbeats to content distribution monitor 120.

Content distribution monitor 120 collects the information/heartbeats received from client 102 via receiver 122. Content distribution monitor 120 then processes the received information using processing pipeline 124. The collected information is made available in real-time to control entities/operators and can be used to provide various information about video streaming. In the example shown, television network XYZ 116 is a customer of the services provided by content distribution monitor 120. An analyst for television network XYZ may use the information provided by content distribution monitor 120 to understand and gain insights into the quality of the streaming experience for users watching XYZ's content.

In the example shown in FIG. 1A, a single content distribution monitor 120 is used. Portions of content distribution monitor 120 may be provided by and/or replicated across various other modules or infrastructures depending, for example, on factors such as scalability and availability (reducing the likelihood of having a single point of failure), and the techniques described herein may be adapted accordingly. In some embodiments, content distribution monitor 120 is implemented across a set of machines distributed among several data centers. A Resilience Service Layer (RSL) can also be used to ensure that the monitoring service is not disrupted when/if a subset of machines fails or a subset of data centers hosting the content distribution monitor are disconnected from the Internet.

While a single client is shown in the example of 1A, there may be numerous clients in the content delivery ecosystem streaming content published by various content publishers. Content distribution monitor 120 may collect and process information received from these various clients streaming content from different publishers, where multiple publishers may be customers of the services provided by content distribution monitor 120.

The unified data model described above is used so that status information in the same format may be collected about clients, regardless of their type (e.g., device type, model, operating system, etc.) and the manner in which they provide raw data. This allows content distribution monitor 120 to process data across client types of publishers in a consistent data model/view. For example, the unified data model is predefined in such a way that content distribution monitor 120 is able to parse and understand the meaning of the fields in the unified data model. This is in contrast to the raw data, which may be in different formats for different clients, publishers, content players, etc.

In the example of FIG. 1A, the translation of the raw data to a unified data model is performed at the client. The translation is performed according to a translation configuration defined, for example, by publisher XYZ. For example, publisher XYZ is given control to define how fields of the unified data model are determined from observed raw data. Different configurations may be defined for different types of clients (e.g., the XYZ app on an iOS device will have a different monitoring module than the XYZ app on an Android device, since different types of raw data would be collected and translated).

While having the translation be performed on the client enforces common player abstraction on the client side, there are various issues. For example, the conversion logic may be complex, and error prone.

For example, developers working for publishers, who have control over the definition of the conversion logic, may make errors in session management as well as the mapping from raw player events/properties to the unified data model.

Further, because the translation is performed on the client-side, data integrity is lost after conversion (because the raw data is lost). Important raw information is lost. Further, there is a lack of extensibility/flexibility to add new metrics due to logic to convert raw events into the unified data model being hardcoded or predefined in the monitoring library at the client. For example, if publisher XYZ decides to make a change to how status information is defined, then a new monitoring module would have to be integrated and installed on the client device to perform the update. This can be challenging due to the numerous devices of varying types. Further, because the raw data from previous sessions is not preserved (since it was lost in the conversion at the client side), then the new metric definition cannot be applied to previous sessions (only those going forward).

Other issues include low information entropy density, duplicate data in heartbeats, and awkward information organization, such as how to indicate what metadata is for what.

Further, in the example of FIG. 1A, having the conversion logic reside in the library on the client and under the control of the customers can lead to measurement inaccuracies and inconsistencies, as well as fragmentation as different customers compute the same measurement item in different ways. For example, because customers (e.g., publishers) are given control of how status information is defined from raw events, there may be differences in data consistency and data quality across the different customers and libraries. Such inconsistencies in the definition of the status information make it challenging for customers to compare their performance against each other.

As one example, consider the video startup time metric, which is a measure of how fast or quickly a video starts playing. Different customers may have different ways of defining this same video startup metric (which may be a part of the unified data model). For example, the video startup time measurement field may be defined to be computed as the time between when a user clicks on a video and the video starts playing. However, the definition may be complicated if pre-roll ads should be taken into account. For example, one customer may consider pre-roll ads in the video startup time, while another customer does not.

Another example of inconsistency in which fields of the unified data model may be defined differently by different customers is the definition of what the start and end of a session are. For example, some customers may define a session as when a video starts playing until playing ceases. However, there may be additional factors to consider when defining or designating session start/end. For example, some video delivery platforms allow replay of a video or content asset. Some customers may consider the replay as part of the same session, while another customer may define the replay as a new session. Ads, such as mid-roll ads may also complicate the session definition. For example one customer may define a session to include both the video and the ads that are played, while another customer may define a session to only include the content requested by the user. The different ways in which the start/stop of a session (or the monitoring of a session) is defined may have downstream effects, as many metrics may be defined relative to the start/end points of the session (e.g., average frame rate of a session).

As another example, suppose that a player is loaded (e.g., the UI component of the player that is visible to the user) when the user clicks on a video that they are interested in, but the user has not yet actually clicked on the play button in the interface. In some cases, the player immediately starts loading the video data without beginning playing. This video starts to load so that the video can be prepared (buffered). For example, several seconds of data may be pre-loaded. In this way, when the user clicks on play, the video will immediately start. If one customer decides to designate the start of the session (and thereby designate the start of monitoring of the session) from the point at which the user clicks play, then the session would have a zero video start time. However, this would ignore the time spent loading the video. A different customer might define the start of the session as when the video starts loading. This would result in a non-zero video startup time determined for the session. When comparing the two customers based on the startup time field in the unified data model, one would appear to have zero startup time. However, the comparison is not accurate due to the inconsistent way in which the metric was computed by the customers. Even though the customers have defined the session/video startup time differently, the raw data will eventually be mapped to the same field in the unified data model. Even within the same customer, inconsistencies can arise in what is measured due to differences in devices/players. However, because the raw data is lost in the conversion of the client side, the backend is unable to provide a consistent startup time metric computation to allow a consistent comparison.

Further, because the monitoring library has built in logic, new integration work is required for any logic changes, such as those required by customers. For example, the library includes a fixed set of data that is to be collected. If there are new data collection requirements, new integration work must be performed.

Described in FIG. 1B and below is server side monitoring and measurement of clients, in which the converting of raw information into the unified data model is performed by a backend such as content distribution monitor 120. As will be described in further detail below, moving the converting logic to the backend allows for a reduction in the integration effort by customers (e.g., when making changes to how clients monitor and report data), as well as increases in the data consistency, accuracy, and quality across customers and libraries and integrations. Traceability (e.g., the capability to trace the raw behavior of players) is also increased. Configurability of the measurement and monitoring is also improved. Thus, long-term overhead for integration, addition of new metrics, and maintenance is reduced.

Server Side Monitoring and Measurement of Client-Side Targets

Figure 1B:
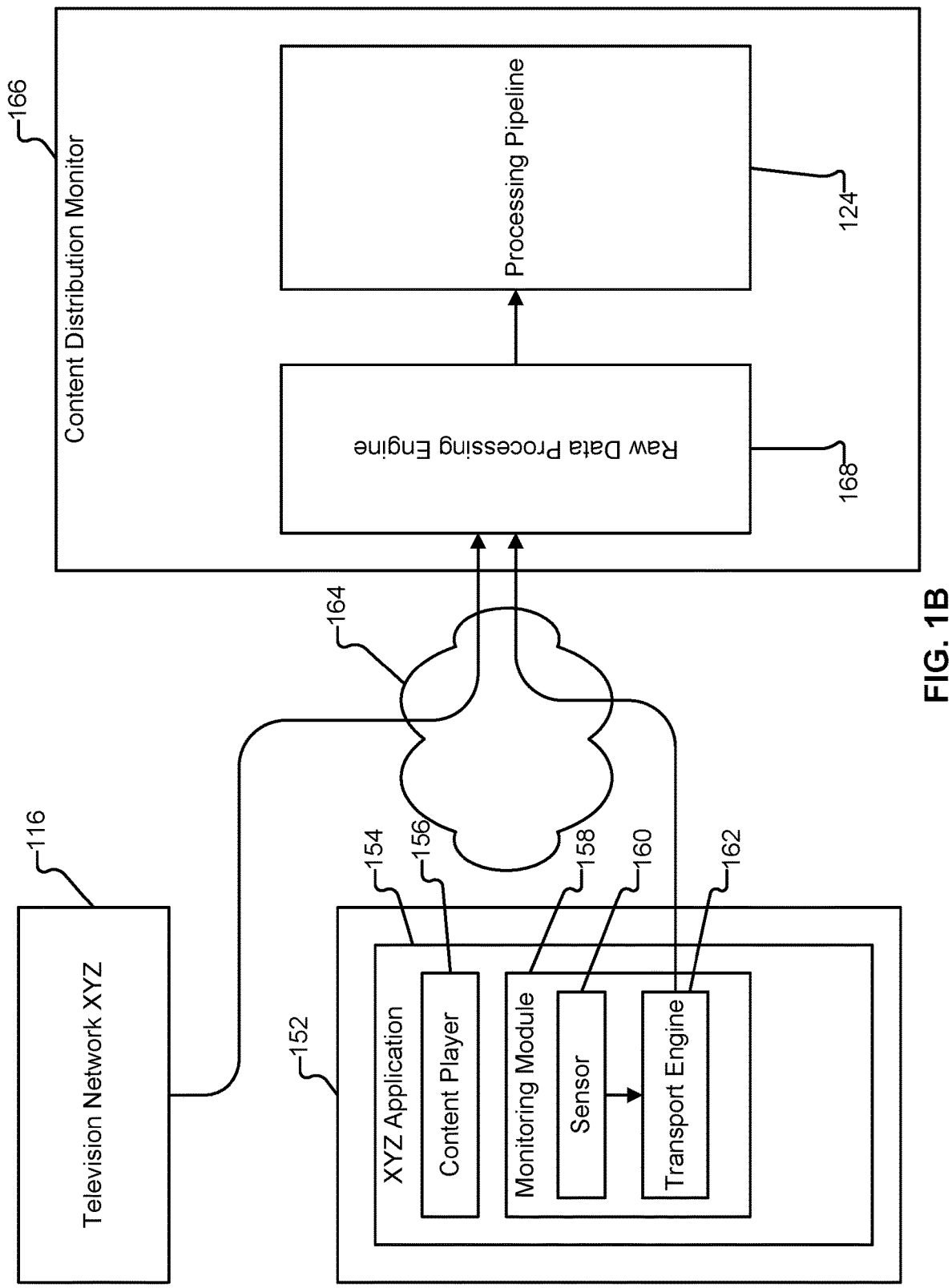
FIG. 1B illustrates an embodiment of an environment in which server side monitoring and measurement of clients is performed.

FIG. 1B illustrates an embodiment of an environment in which server side monitoring and measurement of clients is performed. In contrast to the example of FIG. 1A, a different architecture is provided in which the measurement and monitoring of the client is moved to the backend (e.g., monitor 120). As will be described in further detail below, in contrast to the embodiment of FIG. 1A, the converting or mapping or interpreting of raw events/properties to the unified data model is performed on the backend, rather than at the clients (where, for example, no raw data to unified data model conversion is performed at the clients).

In this example, client 152 also includes a video application for watching content from publisher XYZ (116). The XYZ application includes a content player 156. In other embodiments, a content player provided by the operating system of the device is used for content playback. In this example, the XYZ application includes a monitoring module 158 that includes minimal logic for obtaining raw data and then sending the raw data to the backend.

Monitoring module 158 includes sensor 160 (which in some embodiments is an example of sensor 110 of FIG. 1A), which is configured to monitor/collect raw events/metadata/properties from not only the player, but also from other objects/targets as well, such as the app itself, DRM objects, ads, ad managers, the device on which the app is installed, etc.

In one embodiment, reflection or interception-based techniques for monitoring are used. For example, aspect oriented/reflection-based programming is used, where various data may be intercepted with requiring reading of APIs. Instead, the name of a class or object need only be known. Given a name of an object, the monitoring library is then attached to an instance of that class. Further details of such monitoring are described below.

For example, client 152 includes XYZ's application 154. Mobile app 154 is integrated with monitoring module/library 158. The name of the class of objects/targets to be monitored is provided to the monitoring library. The monitoring library may then attach itself to instances of objects of that class. For example, an instance of a class is instantiated. The instance will be associated with a parameter. An operating system (e.g., of the client device) may have APIs that inform the monitoring module of the class names of the running instances of this class. The library is configured to start listening/monitoring to any instances of the class. The classes may correspond to different types of targets.

The following is an example of initializing the monitor and monitoring various targets. When the XYZ mobile app is opened, the monitoring module (embedded in the XYZ mobile app) is also initialized. The initialized monitoring library is configured to listen in the background for different types of objects (instances of various target classes). Thus, from within the mobile app, the monitoring library can monitor various objects that are instantiated. The user may have multiple apps installed on their mobile device, each of which has embedded its own copy of the monitoring library built in (when multiple apps are opened, each app would have a corresponding initialized monitoring library).

In this example, in which the XYZ app is run and the monitoring library embedded in the ACME app is initialized, the sensor in the monitoring library listens and tracks various objects/targets. In this example, the user selects a video to watch from the XYZ app, and then starts watching the video by pressing on a play button rendered in the interface. The XYZ app and the content player are two examples of targets that may be monitored by the monitoring module 158.

In this example, in response to the user hitting play (or selecting the video), application information of the XYZ mobile app target is obtained. In various embodiments, application information includes the name of the application, the version of the application, and the developer of the application. Further, device information (e.g., device type, an amount of memory on the device, screen size, IP address, etc.) is also obtained (e.g., where the device is another example of a target that is monitored).

As described above, the XYZ mobile app is but one example of a target that the monitoring library tracks. The content player 156 is another target that the monitoring module 158 also tracks. The monitoring module listens for raw events provided by the player and app targets. Attributes of the targets may also be obtained. The attributes may be obtained in response to detection of an event. Attributes of the targets may also be obtained periodically, on a time driven basis (e.g., periodically).

Consider the content player target. An example of a raw event that may be picked up by the monitoring library is a player state change event (e.g., from buffering to playing, to pause, etc., if provided natively as raw data by the player). Other examples of events associated with a player target that may be monitored are bitrate change events, screen size change events, etc.

The occurrence of the event may trigger the obtaining of attributes of the player at the time of the event. Examples of attributes include frame rate, frames rendered, ad time, download speed, chunk downloads, etc. When the player state change event is detected, such attributes are obtained. Obtaining attributes at the time of events allows for an understanding of the player context in which the event occurred. For example, if a playhead time (PHT) event (e.g., movement of the PHT) occurred, the attributes can be used to infer that a seek operation had been performed as part of the event. An example of an app event is a user interface (UI) event.

Obtaining of attributes of the targets on a time driven basis (e.g., periodically) allows for the continuous monitoring of attributes of targets.

As will be described in further detail below, raw events and attributes of the targets are sent to the backend. The raw target information may be sent to the backend continuously.

In some embodiments, monitoring of targets stops based on different events. For example, with respect to determining the end of a monitoring session, if the user exits the app, the monitoring library stops monitoring the video player and app targets (since the monitoring library will also close with the app being closed—the monitoring library can recognize the stop event before it shuts down). If the user clicks stop on the player, then the stop event is tracked and recorded as an event. Other targets may be continued to be monitored.

The following are examples of information that are collected about different targets, as well as raw data that is obtained at monitoring library instance initialization. For each raw event that is collected, the event is associated with a target, timestamp (of when the event occurred), and a sequence number. In some embodiments, the collected raw event information is placed in a format such as a JSON string. Examples of raw data to be collected for targets, such as apps, a content player (AVFoundation player in the below example), device, etc. are shown. Shown also is an example of information obtained for a custom target that includes information about content that is being played.

```
{
    "instance_id": "1512701446000",
    "seq_num": 0,
    "target_map": {
        "AVFoundation": [
            {
                "item_list": [
                    {
                        "target_id": 2,
                        "seq_num": 0,
                        "json_value": {
                            "framework": "AVFoundation",
                            "preferredVolume": 1,
                            "schema": "gen1",
                            "playerName": "11",
                            "hasProtectedContent": false,
                            "memoryAddress": "0x60c000003110",
                            "itemId": 0,
```

```
            "videoType": "normalVideo",
            "url": "http://streamUrl",
            "duration": 0,
            "playerActionAtItemEnd": 1,
            "timeControlStatus":
"AVPlayerTimeControlStatusPaused",
            "downloadSpeed": 8390048,
            "currentMediaServerAdress": "124.193.205.83",
            "referenceRestrictions": 0,
            "resource": "resource",
            "volume": 1,
            "loadedTimeRanges": 0,
            "viewerId": "viewId",
            "frameworkVersion": "1.0.1",
            "position": 0,
            "muted": 0,
            "height": 0,
            "roundTripTime": 0,
            "status": "AVPlayerStatusReadyToPlay",
            "playbackLikelyToKeepUp": false,
            "downloadBytes": 8390048,
            "downloadDuration": 1,
            "width": 0
         },
         "timestamp_ms": 1512701449000
      },
   ],
   "target_id": 2,
   "instance_id": "1512701446000",
   "link_id": 2,
   "target_type": "AVFoundation"
  }
 ],
 "device_info": [
   {
     "item_list": [
       {
         "target_id": 0,
         "seq_num": 0,
         "json_value": {
            "up_time": "4237",
            "deviceManufacturer": "Apple",
            "charging": "No",
            "accessories_attached": "No",
            "device_model": "iPhone",
            "country": "en_US",
            "currency": "$",
            "system_name": "iOS",
            "debugger_attached": "Yes",
            "carrier_country": "US",
            "fully_charged": "No",
            "device_orientation": "-1",
            "number_attached_accessories": "0",
            "proximity_sensor_enabled": "No",
            "used_disk_space": "98.71GB",
            "used_memory": "592.988281",
            "cpu_usage": "4.100000",
            "carrier_mobile_country_code": "",
            "total_memory": "16384.000000",
            "free_disk_space": "366.92GB",
            "connectionType": "WiFi",
            "multitasking_enabled": "Yes",
            "system_version": "11.2",
            "system_device_type": "x86_64",
            "screen_height": "736",
            "name_attached_accessories": "",
            "deviceVersion":
"DarwinKernelVersion17.2.0:FriSep2918:27:05PDT2017;root:xnu-
4570.20.62-3/RELEASE_X86_64",
            "disk_space": "465.63GB",
            "carrier_mobilenetwork_code": "",
            "signal Strength": "3",
            "time_zone": "Asia/Shanghai",
            "headphones_attached": "No",
            "free_memory": "1623.539062",
            "carrier_iso_country_code": "",
            "number_processors": "8",
            "screen_brightness": "50.000000",
            "battery_level": "-1.000000",
            "screen_width": "414",
            "number_active_processors": "8",
            "language": "en",
            "carrier_allows_voip": "No",
            "carrier_name": "",
            "device_name": "dli-MBP-1"
         },
         "timestamp_ms": 1512701446000
       }
     ],
     "target_id": 0,
     "instance_id": "1512701446000",
     "link_id": 0,
     "target_type": "device_info"
   }
  ],
 },
 "have_reported": "0",
 "client_version": "1.0.1"
}
```

The monitoring library does not perform summarization or session management (e.g., designating or calling the start/end of sessions). The customer also does not need to perform such calling of start/stop. The customer also does not have control of when the client-side monitoring/measurement started or ended (in contrast to the example of FIG. 1A, where it is the customer that has control of writing the client side code that defines when monitoring starts/stops).

The movement of control from the client to the backends provides improvements in accuracy and consistency, as well as reduces errors. For example, in the embodiment of FIG. 1A, a developer implementing the monitoring library of publisher XYZ may forget to call the monitoring library API to start a session or end a session (e.g., start/end monitoring of a session). The developer may call the session start too early or too late. For example, one customer might call the start of a session after a pre-roll ad had finished. However, this would miss any technical failures during pre-roll ads, since the failure would not be captured because it was not defined to be included in the session. As another example, developers may call APIs at different times, resulting in inconsistent ways of designating starts and ends of sessions across different publishers.

In the example of FIG. 1B, rather, all raw events/attributes are monitored, and the backend makes the decision of how to interpret the raw events and decide, for example, when a session starts and ends. This results in a lightweight, minimal integration of the monitoring library and the XYZ mobile app. This reduces the possibility of errors (e.g., by reducing the amount of code). Further, this simplifies the different types of integrations needed for different types of devices, which may have various differences resulting in inconsistencies across different customer apps. Reducing the amount of work done by developers working on behalf of the customers also reduces measurement inconsistency and inaccuracy.

The transport engine 162 is configured to send the raw data coming from the targets to the backend. For example, the sensor, which collected the multi-target raw data (raw events and attributes), passes the collected raw data to the transport engine. The transport engine is configured to package the raw data into heartbeat messages. Heartbeats used to transport raw data are referred to herein as "raw heartbeats." The raw heartbeats are in contrast to the heartbeats provided by the client in the embodiment of FIG. 1A, where the payload has already been converted into the unified data model. Such heartbeats including data in the unified model after having been converted from raw data are referred to herein as "unified data model heartbeats."

As described above, in some embodiments, a collected event is associated with a target type (an identifier of the target from which the event was collected), a timestamp of when the event occurred, a sequence number, etc. In one embodiment, the data structure for the payload of the heartbeat is in the JSON string format, as shown above.

Figure 2:
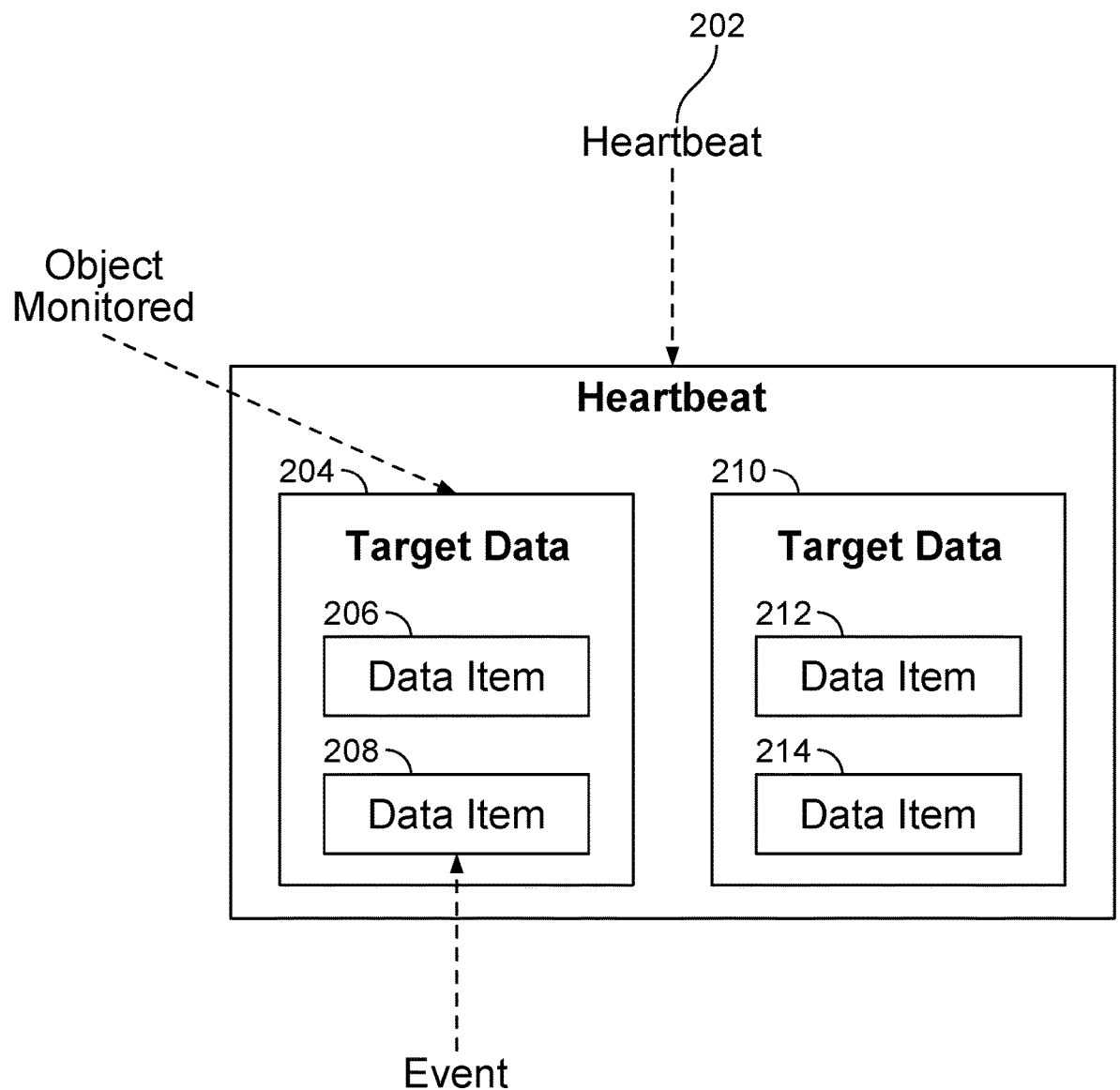
FIG. 2 illustrates an embodiment of a data structure of a heartbeat.

FIG. 2 illustrates an embodiment of a data structure of a heartbeat. In the example shown, heartbeat 202 includes raw data for two types of targets, 204 and 210. Each target may have multiple data items (e.g., data items 206 and 208 of target 204, and 212 and 214 of target 210), where a data item corresponds to a raw event. For example, the player target may have data items corresponding to a player state change event and a loading event. The app target may have a UI change event recorded as a data item. The data items that are included in a packet may depend on the interval in which heartbeats are sent. For example, any data items that occurred between the heartbeat transmission interval are packaged into a same heartbeat for transmission to the backend.

As described above, each data item (event) has a corresponding timestamp of when the event happened. Each data item also has a sequence number indicating the ordering of the events that occurred for the target. Such an ordering allows, for example, the backend to determine if there are any gaps in the transmission of events (e.g., if the backend observes a gap in the sequence number of received events, this may be an indication that a heartbeat including the skipped event was dropped during transmission).

The heartbeats are sent as packets that are transmitted to the backend 166.

Multiple data items may be packaged into a single packet. Packets may be sent periodically (e.g., on a 20 second interval). Packets themselves may also include sequence numbers.

In some embodiments, each packet is sent to the backend via a uniform resource locator (URL). The URL may include a customer identifier, device identifier, and instance identifier. Such information may be obtained when the app initializes (hence the corresponding instance id of the app instance), and may be used to index the information in the packets. A single device may start the XYZ app multiple times, where each app start is associated with a corresponding instance identifier. Each packet also includes a packet identifier The following is an example of a URL (POST) for sending raw heartbeats:

http://<account>.api.conviva.com/<version>/customers/<cust id>/devices/>dev_id>/instances/<ins_id>/packet/

In contrast to the embodiment of FIG. 1A, in which at least some level of interpretation (e.g., summarization of raw data/conversion of raw data to the unified data model) is performed on the clients, in the server-side translation architecture described herein, no interpretation of raw data is performed on the client, only collection. This simplifies the client side logic. Having more lightweight code reduces the processor burden to perform the conversion. This also simplifies the code that is deployed on clients. For example, clients can effectively receive the same or similar client code, with only minor variations based on different targets on devices, user interfaces, skins, etc. However, the same monitoring libraries could be provided to customers, such that different libraries for the customers would not have to be managed. For example, instead of defining metrics (e.g., start/stop of session, startup time, etc.) and implementing them in client side libraries, which are customer specific, a single lightweight library can be distributed to clients for collecting and transporting raw data, while the interpretation/conversion logic is placed at the backend.

In an environment where it may be challenging to make changes to remote clients, the simplification of code allows for a more efficient deployment of code. Changes may be made effectively without requiring end users to obtain a new application from an app store (and instead send new configurations of monitoring). Different client-side libraries for different publishers/customers would not have to be managed.

The packets sent by transport engine 162 are sent to content distribution monitor 166 (e.g., over network 164 such as the Internet). Content distribution monitor 166 includes raw data processing engine 168. Raw data processing engine 168 is configured to convert the raw target data items in the raw heartbeats into the unified data model. In some embodiments, raw data processing engine 168 converts the raw heartbeats into unified data model heartbeats. The unified data model heartbeats would be, for example, in the same form as the heartbeats provided by client 102 of FIG. 1A. The unified data model heartbeats generated by gateway may then be passed to processing pipeline 124, as in FIG. 1A.

Figure 3:
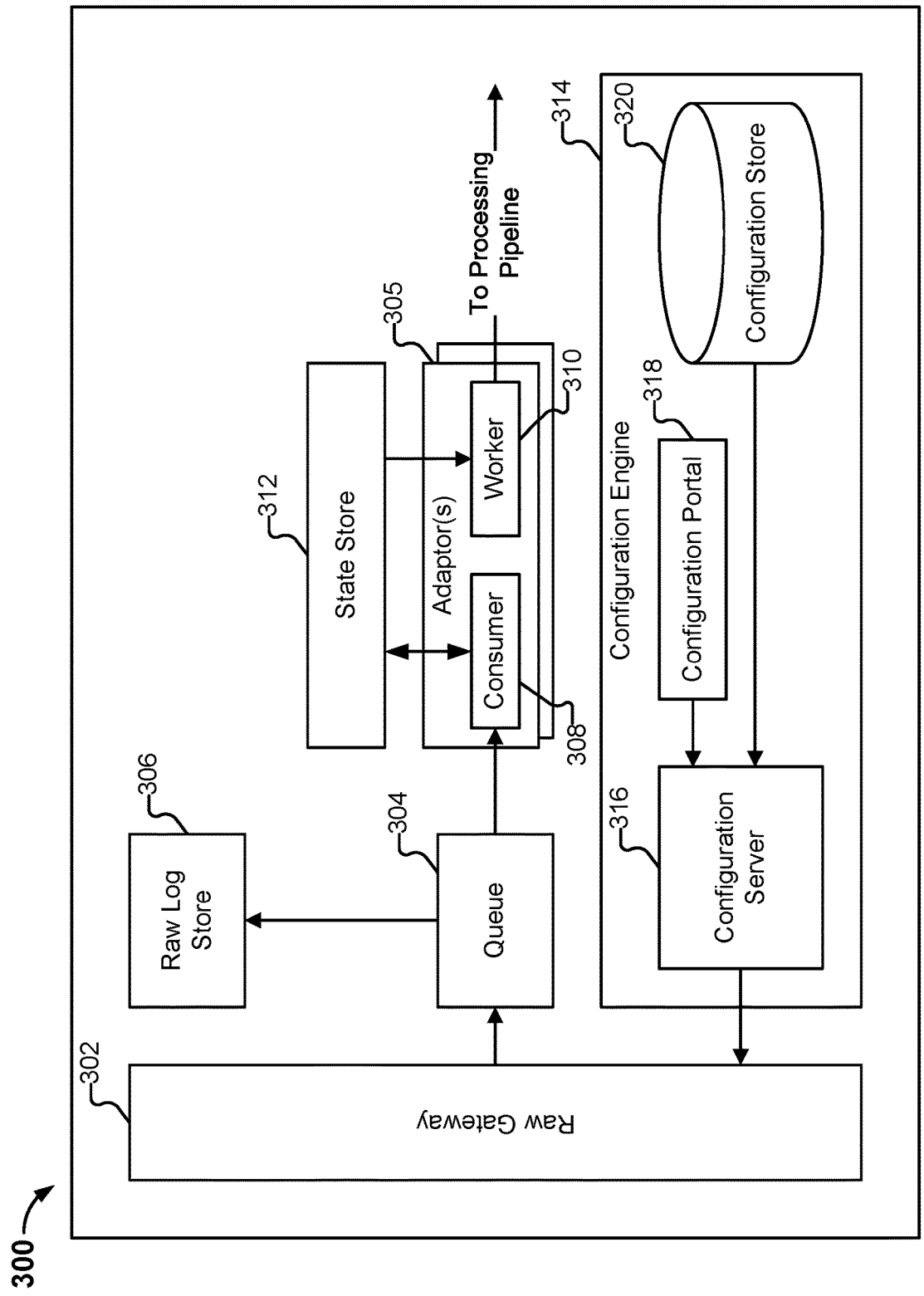
FIG. 3 illustrates an embodiment of a raw data processing engine.

FIG. 3 illustrates an embodiment of a raw data processing engine. In one embodiment, raw data processing engine 300 is an example of raw data processing engine 168 of FIG. 1B. In this example, raw gateway 302 is implemented as a Hypertext Transfer Protocol (HTTP) server. In some embodiments, the gateway is Go-based. Raw heartbeat (packets) are obtained from remote clients such as client device 152 of FIG. 1B. The payload (raw data items for various targets) is extracted from the raw heartbeat (packet).

The payload is placed in queue 304. In one embodiment, the queue is implemented as a Kafka queue. The raw data is preserved. Although not all of the raw data might be used immediately, it is preserved, for example, in case it can still be used at a future time (this is in contrast to the embodiment of FIG. 1A, where the raw data at the client would no longer be accessible after it has been translated at the client).

In this example, the raw data is passed to raw log store 306. In some embodiments, the raw data is stored to a data store, per customer identifier, and bucketed by time. In one embodiment, the raw logs are stored to a cloud data store such as Amazon S3. S3 connectors may be used. As one example, the S3 connectors are run (e.g., every hour) via schedule tasking in order to fetch the previous hour's logs, which are then backed up to an appropriate S3 bucket.

In various embodiments, the data structure for a raw log that is stored may include various information, such as a client identifier, instance identifier, platform, framework, client version, timestamp of when the packet including the raw log arrived at the gateway (e.g., gateway 302), the client IP address as seen by monitor 166 (e.g., IP or IPv6), as well as the raw packet data that was received.

The raw data is also passed from queue 304 to adaptor(s) 305. Adaptors 305 are configured to convert or translate or map or interpret the raw data into fields of the unified data model.

In some embodiments, each customer is associated with their own corresponding set of adapters. Adaptors may also be used across customers. Different adapters may be used in order to provide customer-specific logic that is tailored to the respective customers.

In the example shown, each adaptor is configured to perform the conversion of raw data for a particular corresponding target type, where there is a one-to-one correspondence between target types and adaptors. For example, there may be an adaptor for a content player target, another adaptor for a particular mobile app, another adaptor for a particular type of device target, another adaptor for a type of DRM target, etc. In some embodiments, for an event to be processed, the target type identifier associated with the raw event is obtained and used to identify or select an appropriate adaptor to use to process the raw event.

Each adaptor has knowledge of the raw data that is present for the target type, as well as the logic to interpret the fields of the raw data for the corresponding target type. For example, the adaptor for the AVFoundation player is configured to parse and process fields in the raw data for the AVFoundation player (which for example is in the JSON format), while the adaptor for the XYZ app player is configured to parse and process fields in the raw data for the XYZ app.

The following is an example of using an adaptor to map raw data from a content player to player state changes specified according to a unified data model. The logic of the adaptor corresponding to the player target type identifies certain raw data fields and uses the raw data to infer what state the player was in. As one example, suppose that the unified data model includes a field for indicating whether the player was paused. The logic for determining whether the player was paused evaluates the raw data of the events of the player according to a set of rules. If the raw data matches the rules, then it is inferred that the player was "paused." This is then designated in the unified data model.

The adaptor logic also includes code for performing computations to determine, for example, metrics or other fields specified in the unified data model.

The following is an example of adaptor logic for a player target that evaluates the raw event/attribute data from the player to determine if the player is stopped. In this example, the adapter looks for the raw data for the duration of the content being watched (e.g., the length of the video) and the position of the current playhead time (indicating at what point in the video the user is currently at). If the difference between the duration and the current playhead time position is less than some threshold, then this indicates that there was only a threshold amount of the content remaining to be watched. Based on the computation of the difference and the comparison to the threshold, the adaptor infers or otherwise determines that the video ended and was stopped. The corresponding player state field in the unified data model is then set to stop. The session may also be designated as stopped.

The adaptor may also determine the start of the session based on an evaluation of certain raw events/attributes against a set of logic/rules. For example, the adaptor may look for an event that indicates that loading of content has started. The loading event is used to designate the start of the session. As another example definition, the adaptor uses the user's clicking of play event as the indication of the start of the session.

Another example of determining session start/end is when the session starts when data loading starts, instead of the video starting playing. For that, the event for data loading is identified, and that time of the data loading is used as the starting time of a session. For this case, session monitoring starts before the video is visible to end users.

Thus, in this example, the designation of the start/stop of the session is not controlled by the customer, but rather by the backend. As many metrics are defined with respect to when a session starts and ends (e.g., video startup time), moving control of the designation of the start/end of sessions to the backend removes a potential vector of inaccuracy/inconsistency.

FIGS. 4A-4H illustrate embodiments of adaptor logic and mappings between raw data fields/events and fields/events of a unified data model. In this example, translation of iOS raw data to unified data model fields/events is shown. In particular FIGS. 4A-4E illustrate example mappings of raw data to fields of the unified data model. FIGS. 4F-4HI illustrate example mappings of raw data to events of the unified data model.

An adaptor may include various components. In one embodiment, components of an adaptor include a consumer 308, worker 310, and state storage 312. In one embodiment, state storage 312 is implemented using Redis. The consumer is configured to generate a complete state snapshot, using the Redis store as storage. The worker is configured to generate heartbeats in the unified data model format based on the client state generated by the consumer. In one embodiment, the state storage is implemented using a master-slave configuration. Automatic failover may also be implemented for the store (e.g., using Redis sentinel).

In the above example, there were multiple adaptors for processing raw data from different types of targets. Having different types of adaptors provides modularity in the conversion process. In other embodiments, rather than using multiple adaptors for different types of targets, a single adapter is used that is configurable to convert different types of targets. In one embodiment, the single adapter is adapted to process different target types by loading different configuration files that transform the single adaptor into an adaptor usable to process a particular type of target. For example, the target type of the object instance to be processed is dynamically determined. For example, the target type identifiers in the raw events to be processed are obtained. A configuration file corresponding to the dynamically determined target type is obtained. The adaptor loads up the functions that are in the configuration file that are appropriate for the target type. The configured adaptor now has the logic, which when executed, translates the raw events of the target type. For a different type of target, a different configuration would be obtained, changing the functionality of the single adaptor.

In some embodiments, the output of the processing of the raw data by the adaptors are heartbeats where the payload is in the unified data model format ("unified data model heartbeats"). The unified data model heartbeats are then passed for further analysis or processing, for example, to a processing pipeline such as processing pipeline 124.

As shown in the above example embodiment of FIG. 1B, the raw data from disparate devices, apps, etc. is translated, at the backend, into the unified data model. This is in contrast to the embodiment of FIG. 1A, where the unification of raw data from different players, libraries, etc. into the unified data model is performed by the clients.

Various outputs may be provided by content distribution monitor 166 based on the raw data processing. For example, two different customers may receive the same type of data presented two different ways (because of the different ways they define the same metric). A global benchmark may also be computed that allows the two different customers to be directly compared. The global benchmarks may be computed because the original raw data from which the metrics are computed is maintained by the backend. An example of output for two different customers for the same type of data, as well as a global benchmark, is described below in further detail.

As will be described in further detail below, the raw data collection and translation of raw data to a unified data model is configurable.

Configuration of Monitoring and Measurement of Streaming Sessions

Continuing with the example of FIG. 3, raw data processing engine 300 further includes configuration engine 314, which further includes configuration server 316, configuration portal 318, and configuration store 320. Using configuration engine 314, configuration of raw data collection, adaptors, and computation of metrics may be performed.

Configuration of Raw Data Collection

Changes to monitoring of objects/targets on clients may be dynamically made via configurations (e.g., configuration files). These configurations are sent to the client, without having to modify the app itself. The configuration of raw data collection includes the configuration of monitoring of targets.

When the data collection configuration is sent to the clients, the monitoring is performed according to the configuration. New types of objects may be targeted by adding them to the configuration sent to the clients.

Various levels of configuration may be specified to control the monitoring behavior of the client library.

Figure 5:
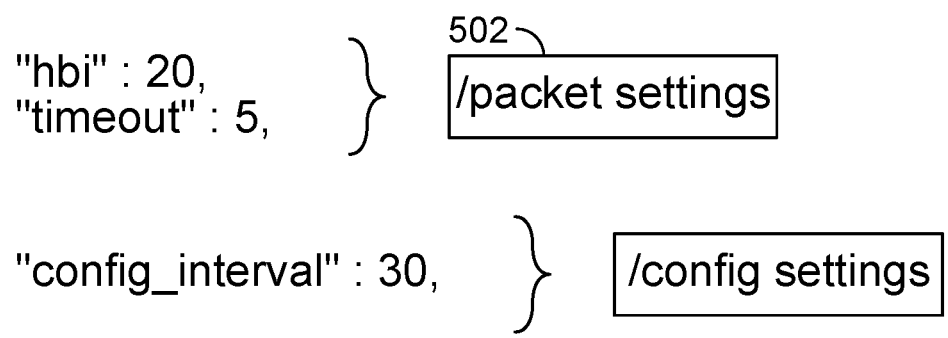
FIG. 5 illustrates an embodiment of a raw data collection configuration.

FIG. 5 illustrates an embodiment of a raw data collection configuration. At the communication/transmission protocol level, configuration of heartbeats may be specified, as shown at 502. For example, heartbeat interval (hbi) (i.e., the interval of packet delivery may be changed) may be configured. A timeout period may also be specified in the configuration. The timeout field is an amount of time after which the client will resend a packet if the client has not received a response to a previously sent packet within the timeout period.

The raw data collection configuration may also be used to specify, at the target level, what attributes to pull and what events to listen to. For example, the events/attributes to be collected may be filtered using blacklists and whitelists (e.g., by specifying the keys in the filtered lists). This can be used to control the amount of raw data that is collected and transmitted from the client to the backend (e.g., to save network resources such as bandwidth). For example, if it is decided that the memory address field no longer needs to be collected, then the memory address raw data can be added to the blacklist of the configuration. The client library, upon implementing monitoring according to the configuration, will then no longer collect the memory address raw data.

In some embodiments, the client configuration is pushed to the clients. In other embodiments, the clients poll the content distribution monitor 166 for new configurations.

Figure 6:
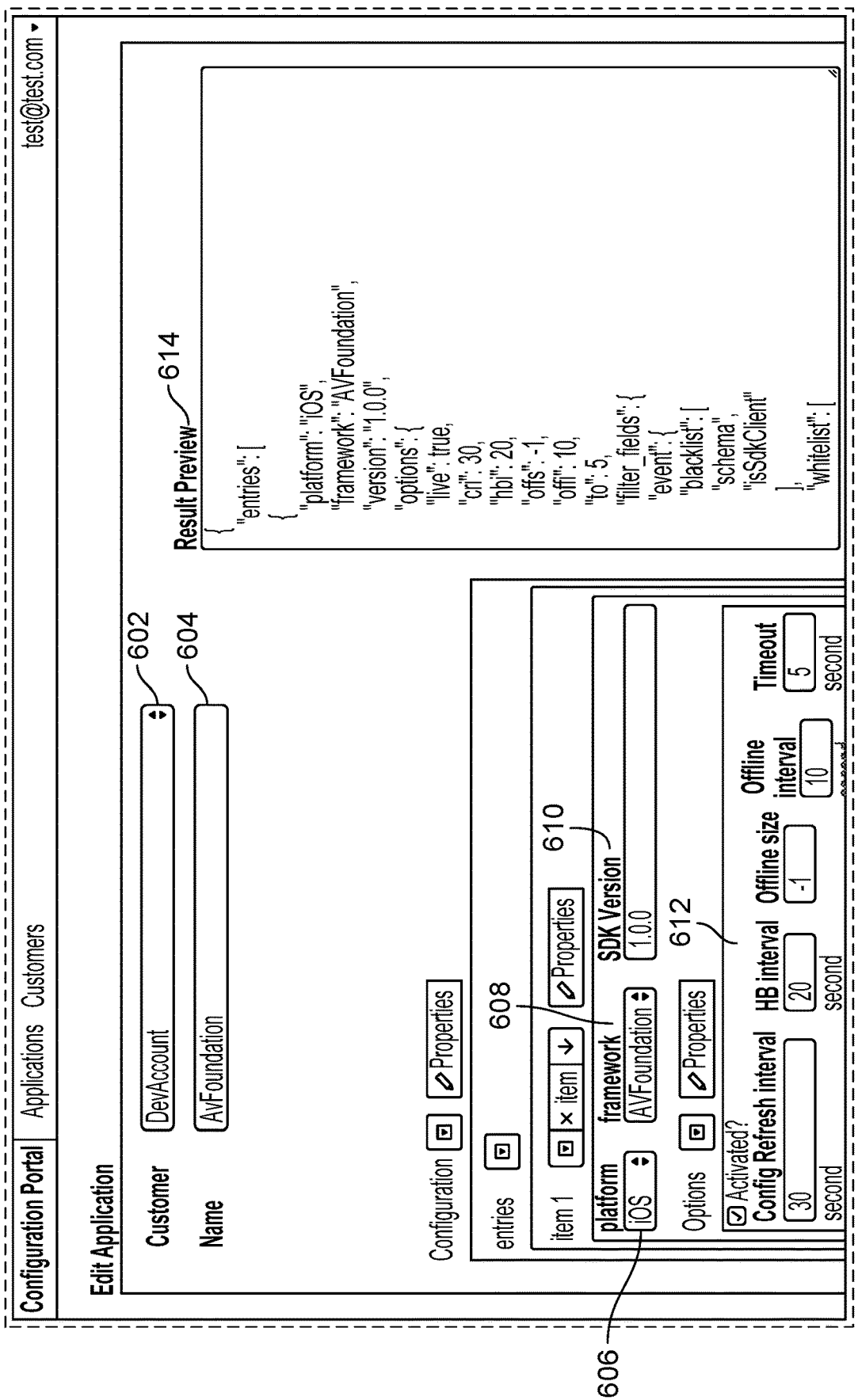
FIG. 6 illustrates an embodiment of a configuration portal.

FIG. 6 illustrates an embodiment of a configuration portal (e.g., configuration portal 318, provided via configuration server 316). In this example, the configuration portal provides a graphical user interface (GUI) by which users may specify data collection configurations to be sent to clients. In the example shown, a user associated with a customer 602 specifies a configuration for a target 604 (AVFoundation player in this example). The configuration is specified for a particular operating system (iOS, as shown at 606), for a particular framework (AVFoundation, as shown at 608), and a particular SDK version (1.0.0, as shown at 610). At 612, various options for the configuration such as configuration refresh interval (e.g., in seconds), heartbeat interval (e.g., in seconds), offline size, offline interval, and timeout (in seconds) may also be specified.

At 614, a preview of the configuration file, according to the user specification, is shown. Portions of such a configuration file are described above in conjunction with FIG. 5. Different configurations may be stored to configuration store 320.

Configuration of Adaptors

The behavior of adaptors may also be changed or modified. As described above, definitions of mappings between raw events/attributes and fields of a unified data model may be specified or configured by customers, where different customers may define their own mappings. The adaptors use the configuration of the mappings to translate raw data to fields/events of a unified data model.

Configuration of Metrics

The server-side raw data processing described herein provides increased flexibility to modify or define/add new metrics computed from raw data. This includes metrics that are computed from raw measurements that are converted into the unified data model. Because the backend has collected all of the raw events/attributes and stored them, they are accessible if new metrics are to be computed dynamically/on the fly.

The new metrics definitions may be added at the backend (content distribution monitor 166) rather than having to update the apps on numerous client devices of disparate types.

As one example, consider the metric, frame rate. In the example of FIG. 1A, a summarization of raw frame samples would be performed on the client to compute the frame rate. For example, a value that is the average of the frame rate that is occurring on the client device would be sent over, rather than the raw samples of frame rate that are collected at the client. In the example of FIG. 1A, in order to change the definition of frame rate, the code for computing the average frame rate on the client side would have to be changed. In the sever-side techniques described herein, such client side modification would not need to be performed in order to change the frame rate definition. Instead, the raw samples of observed frame rate are sent to the backend, and the change to the frame rate definition is made on the backend. Further, because raw data is stored at the backend, the new frame rate definition may be retroactively applied to previous sessions by using the historical raw framerate samples. Thus, in this example, in contrast to having to modify the client to implement a new metric, as would be the case in FIG. 1A, in the environment of FIG. 1B, the client does not need to be changed or modified in order to implement the new metric. Custom metrics may also be defined based on raw data.

Further Details Regarding Configuration of Metrics

There are various reasons for why a metric is defined and why it is defined in a particular way. This may depend on the use cases for the use of the metric. For example, there may be hundreds of customers of the services provided by content distribution monitor 166, each with their own experiences in video QoE monitoring and optimization. Content distribution monitor 166 has defined a set of metrics (e.g., as part of its unified data model) that are usable for many common use cases. However, there are cases when the need of a particular customer is somewhat different, such that the customer may wish to have different ways to define a particular metric. The following are examples to illustrate the different ways in which the same metric may be defined (e.g., by different customers or by the same customer for different purposes).

Video startup failure percentage: In one embodiment, video startup failure (VSF) percentage is defined as the percentage of video attempts that ended up failing to watch the video because, for example, of fatal errors.

In practice, some customers treat different fatal errors differently. For example, for some customers, a fatal error can be caused by geo-restriction of the content. Since the restriction is related not only to the viewer's geolocation (e.g., which cities and states in the United States), but also related to a particular content that the viewer tries to watch (e.g., only a particular live event that is blacked out for that city), the geo-blocking should not be implemented at the viewer level, but at the level of each video attempt. Thus, removing geo-blocking related errors may be useful if the VSF metric is used for technical operations that are mostly concerned about delivery errors versus business errors.

Some customers may also decide to remove DRM (digital rights management) errors from the VSF metric definition. DRM errors may be related to a business (e.g., a viewer has not purchased the right to watch a particular video), but may also be related to a delivery problem (e.g., a DRM server is not working well, and the viewer is unable to watch a video even though they have purchased the rights to watching the video). The customer can further refine the DRM errors to decide which should be included in the VSF and which should be excluded in the VSF metric definition.

One customer (e.g., publisher XYZ) may define VSF after removing geo-blocking errors because the application did not block the viewer from attempting the video even though the video is not available to the viewer at the mobile application user interface level. Another customer (e.g., suppose another publisher ACME that also utilizes the services provided by content distribution monitor 166) may define VSF after removing DRM errors. Thus, the customer-defined versions of VSF are not directly comparable. Nonetheless, the backend may use a common, globally defined VSF to allow customers to compare and benchmark each other, and determine whether their viewers have higher rates of attempts that ended with failure errors or not. By doing so, business-related errors can be prevented because the application can make it clear to the viewer that the video is not available to the viewer, even before the viewer attempts to watch (e.g., by greying out the video that is not available to the viewer because of business reasons, either because of geo-restrictions or the rights having not been purchased). Allowing a viewer to attempt to play content that is already known to fail will result in a poor end user video experience. In the backend, a separate, global benchmark VSF may be specified that is specifically defined for video delivery that excludes geo-blocking and non-delivery based DRM errors as well.

Video re-buffering interruption rate: In one embodiment, video re-buffering interruption rate is defined as the number of times the video playback is interrupted by re-buffering per actively engaging minute (i.e., the time the viewer is trying to watch, and time of non-activity, such as pause and stop are not counted).

Because of various player limitations, some interruptions may be very short, and not visible to the user. Different customers may use different thresholds for determining whether an event is an interruption. For example, for a default definition of the video re-buffering interruption rate, the content distribution monitor 166 can use 100 ms as the threshold to determine whether an interruption is too short for a viewer to notice. However, some customers may decide to use 200 ms, while other customers may decide to use a threshold of 50 ms. In the benchmark use cases, all customers are held to the same threshold and standard so that the comparison is fair. However, as described above, customers may know their specific viewer groups better and decide for their own versions of the metric to use different thresholds.

Buffering impacted play: In one embodiment, buffering impacted play (BIP) is used to define whether a particular video playback is impacted by re-buffering. As with the other metrics described above, there may be many different ways to decide what level of re-buffering would affect the viewer in some major way. Thresholds may be used to classify those impacted plays from other plays that are not as impacted. For example, the backend may define one threshold (e.g., 1% of re-buffering), while some customers may decide to use lower thresholds (e.g., 0.4%) for their businesses, while yet other customers may decide to use a higher re-buffering ratio threshold (e.g., 2%).

Different Definitions of Metrics for Different Types of Content

In the above examples, different customers defined their own versions of metrics. However, different definitions of metrics may be defined for other scenarios, such as based on content type.

The following is an example of the same metric being defined differently based on whether the content being viewed is episodic or linear television. Content being watched as VoD (video on demand) versus content being watched as part of linear television should be measured differently. For example, for video startup time (VST), when the content is VoD, there are usually many steps before the content starts to play, resulting in the VST being non-negligible. However, if the content is part of a linear TV channel, it is highly likely that the content is pre-buffered before the viewer gets to the content, and hence the VST will be 0. Measuring the VST for that content in the middle of a linear TV channel is not very meaningful. Thus, VST for such content should be defined differently. As one example, in the linear TV case, the VST of content in the middle linear TV is not defined at all (instead of having a value of 0), and will therefore not populate an aggregate VST calculation (i.e., will not bring down an average VST computation with many values of 0).

Implementing a New Metric

Metrics may be defined based on an understanding of typical use cases. For example, metrics for content may be defined separately from metrics for advertisements, because typically those users looking at content issues are different from users looking at advertisement issues. However, in some organizations, a combined product team or operational team may wish to see the total user experiences combining content and ad experience together. In this case, a new metric for the combined experiences may be defined differently from the metrics separately defined for content and ads individually.

For example, for content, re-buffering time may be defined as all of the re-buffering time when the content is played, where the re-buffering time that occurred during advertisement breaks is excluded. Similarly, re-buffering for advertisements would only take into account the re-buffering that occurs when a particular ad is playing. One example of a combined re-buffering metric (implemented as a new metric via configuration engine 314) would take into account all of the re-buffering that occurred during all playback, either for the content, or for the ad, and in some cases, any re-buffering that occurs between content and ads (as well as any re-buffering between ads).

Another example of defining a new metric is implementing a metric related to signal strength and its impact on re-buffering. For example, signal strength may be collected from devices (at a certain time granularity). Player state changes may also be collected. One metric that may be implemented is to group by signal strength within a session (where signal strength is according to a scale of 0-5 bars), and a timeline is generated of when signal strength moved from one number of bars to another number of bars and then calculating the buffering ratio at each bar level (e.g., calculate for all the time intervals when the signal strength is 5 bars, how much playtime, and how much buffering time, summing them up to calculate the buffering ratio when signal strength is 5 bars—and then similarly calculating buffering ratio at signal strength of 4 bars, 3 bars, etc.).

As another example, consider EBVS (exit before video start). Viewers may quit before video playback starts. For example, a viewer may exit during a pre-roll ad. A viewer may also quit if they are waiting too long while the video is buffering. Using the techniques described herein, at the backend, a new metric may be defined such as exit during pre-roll ad, and another new metric that corresponds to exits while waiting for a content buffer to build up (i.e., exit because the viewer did not want to wait for buffering).

Redefining a Metric

In the above BIV example, different customers defined different thresholds. That is an example of redefining an existing metric. Other ways of redefining an existing metric include changing the way in which metrics are computed or aggregated from raw data For example, instead of using averages (e.g., average buffering ratio), metrics may be redefined according to percentiles of the metrics (e.g., $25^{th}$ percentile, $50^{th}$ percentile, $75^{th}$ percentile, $90^{th}$ percentile, etc.). Distributions with different ranges may also be defined (e.g., re-buffering ratio between [0, 0.1%), [0.1%, 0.2%), [0.2%, 0.3%), [0.3%, 0.4%), . . . [0.9%, 1.0%), . . . etc.).

Example Outputs and Reports

Various reports may be provided as output based on the processing of the raw data obtained from various clients of various customers that utilize the services of content distribution monitor 166. For example, as described above, two different customers may get the same type of data presented two different ways (because of the different ways that they define the same metric), while there is also a global benchmark that may be used to provide a ground truth for direct comparison of customers with respect to the benchmark/standardized definition of the metric.

Take, for example, the same data set: 10 plays in the data set with the following buffering ratio: [0.0, 0.0, 0.0, 0.0, 0.0, 0.0, 0.2%, 0.5%, 1.5%, 2.8%]. If this data set is for customer XYZ, who uses 0.4% as the BIP threshold, then customer XYZ has only three out of 10 customers that have buffering impacted play. However, if the data set is for a different customer (ACME), who uses a 2.0% threshold, then ACME would only have 1 out of 10 plays as being BIP. The backend may define a global benchmark for BIP based on the threshold of 1%. In which case, when comparing XYZ and ACME, both would have two plays out of 10 that are BIP.

Figure 7:
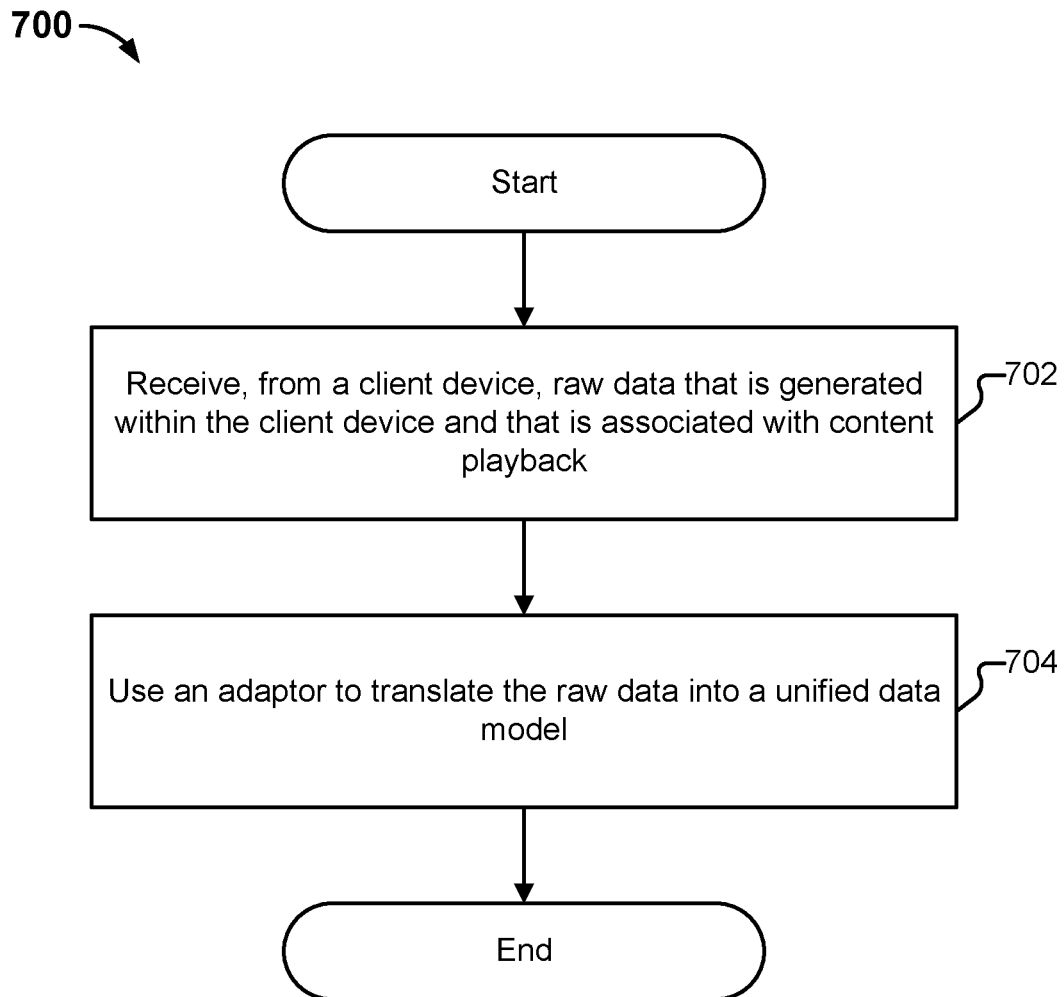
FIG. 7 is a flow diagram illustrating an embodiment of a process for remote multi-target client monitoring for streaming content.

FIG. 7 is a flow diagram illustrating an embodiment of a process for remote multi-target client monitoring for streaming content. In some embodiments, process 700 is executed by content distribution monitor 166 of FIG. 1B. The process begins at 702, when raw data is received from a client device. The raw data is generated within the client device, where the raw data is associated with content playback. The raw data (e.g., raw events and attributes) may be collected from various types of targets on the client device. Examples of targets include content players, applications, devices, DRM objects, etc.

At 704, an adaptor is used to translate the raw data into a unified data model. For example, the translating includes determining, from the raw data received from the remote client device, a designation of at least one of a start and an end of a monitoring session. Raw data may also be translated into other fields or events of the unified data model, such as player state changes, error events, seek custom events, etc. In some embodiments, different adaptors are used to translate the raw data from different types of targets. In other embodiments, a single adaptor is used to convert the raw data, where a configuration appropriate for a particular type of target whose data is to be converted is selected and used to configure the adaptor to convert the raw data.

Described herein are techniques for server-side interpretation of multi-target raw data collected from remote clients. There are various advantages to moving the raw data conversion from the client (as in the example of FIG. 1A) to the backend (as in the embodiment of FIG. 1B). As one example, the unified data model may need to change often. By moving the conversion logic to the backend, the modifications may be performed at a single place (the backend) rather than having to modify numerous client end-points of disparate types. For example, customers can easily adjust the way metrics are computed from raw data at the backend. Further, because raw data is maintained at the backend (and not lost as it would be in the client-side conversion of FIG. 1A), the new metric definition can be back-computed or applied to previous sessions since the historical raw data is preserved and accessible.

Another example of an advantage is that any type of target object (not limited to just a content player) may be monitored, as described above. Accuracy of status information is also improved, as errors can be reduced by moving control of raw event translation to the backend. As described above, in the example of FIG. 1A, different publishers write their own libraries for their end users. Developers for the publishers would define how status information is converted from raw events. While this gives developers creating the apps on behalf of the publishers large amounts of flexibility to adjust definitions, this may result in mistakes and inaccuracies due to the misuse by the developers of how to define events such as sessions. For example, a customer could accidentally designate the start of a session too late, partway through a startup phase. As another example, some customers may forget to call the session end at an appropriate time. This would also impact the session-level metrics that are computed. For example, this would cause a shorter startup time to be recorded than what was perceived from the end user perspective. Moving the conversion logic to the backend can help to mitigate such mistakes and inaccuracies.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
a processor configured to:
receive, from a remote client device, raw data generated within the client device, wherein the raw data is associated with content playback;
based at least in part on a target type associated with the remote client device, select an adaptor from a plurality of adaptors, wherein at least some adaptors in the plurality of adaptors are associated with different target types; and
use the selected adaptor to translate the raw data into a unified data model, wherein the translating comprises determining, from the raw data, a designation of at least one of a start or an end of a monitoring session, wherein the designation of the at least one of the start or the end of the monitoring session is determined from the raw data according to a mapping specified by the selected adaptor, and wherein a different adaptor associated with a different target type comprises a different mapping; and
a memory coupled to the processor and configured to provide the processor with instructions.

2. The system of claim 1 wherein the raw data comprises at least one of raw events and raw attributes collected from a target within the client device.

3. The system of claim 1 wherein the raw data is collected from a plurality of targets.

4. The system of claim 3 wherein the plurality of targets comprises at least one of a content player, a mobile application, a device, and a digital rights management (DRM) object.

5. The system of claim 1 wherein the raw data comprises an identifier of the target type, and wherein the adaptor used to translate the raw data is selected from the plurality of adaptors based at least in part on the identifier of the target type.

6. The system of claim 1, wherein the processor is further configured to:
store the raw data as historical raw data;
receive a modification to the mapping specified by the adaptor; and
retroactively use the modified mapping on at least a portion of the historical raw data.

7. The system of claim 1 wherein the raw data is received in a first heartbeat, and wherein translating the raw data into the unified data model comprises generating a second heartbeat from the raw data in the first heartbeat.

8. The system of claim 1 wherein translating the raw data into the unified data model comprises determining, based at least in part on the raw data, a state of a content player.

9. The system of claim 1 wherein the processor is further configured to store the raw data.

10. A method, comprising:
receiving, from a remote client device, raw data generated within the client device, wherein the raw data is associated with content playback;
based at least in part on a target type associated with the remote client device, selecting an adaptor from a plurality of adaptors, wherein at least some adaptors in the plurality of adaptors are associated with different target types; and
using the selected adaptor to translate the raw data into a unified data model, wherein the translating comprises determining, from the raw data, a designation of at least one of a start or an end of a monitoring session, wherein the designation of the at least one of the start or the end of the monitoring session is determined from the raw data according to a mapping specified by the selected adaptor, and wherein a different adaptor associated with a different target type comprises a different mapping.

11. The method of claim 10 wherein the raw data comprises at least one of raw events and raw attributes collected from a target within the client device.

12. The method of claim 10 wherein the raw data is collected from a plurality of targets.

13. The method of claim 12 wherein the plurality of targets comprises at least one of a content player, a mobile application, a device, and a digital rights management (DRM) object.

14. The method of claim 10 wherein the raw data comprises an identifier of the target type, and wherein the adaptor used to translate the raw data is selected from the plurality of adaptors based at least in part on the identifier of the target type.

15. The method of claim 10 wherein the raw data is received in a first heartbeat, and wherein translating the raw data into the unified data model comprises generating a second heartbeat from the raw data in the first heartbeat.

16. The method of claim 10 wherein translating the raw data into the unified data model comprises determining, based at least in part on the raw data, a state of a content player.

17. The method of claim 10 further comprising storing the raw data.

18. A computer program product embodied in a non-transitory computer readable storage medium and comprising computer instructions for:
receiving, from a remote client device, raw data generated within the client device, wherein the raw data is associated with content playback; and
using an adaptor to translate the raw data into a unified data model, wherein the translating comprises determining, from the raw data, a designation of at least one of a start and an end of a monitoring session.

19. The method of claim 10, further comprising:
storing the raw data as historical raw data;
receiving a modification to the mapping specified by the adaptor; and
retroactively using the modified mapping on at least a portion of the historical raw data.

* * * * *

UNITED STATES PATENT AND TRADEMARK OFFICE
CERTIFICATE OF CORRECTION

| | |
|---|---|
| PATENT NO. | : 11,323,500 B1 |
| APPLICATION NO. | : 16/031743 |
| DATED | : May 3, 2022 |
| INVENTOR(S) | : Ming Liu et al. |

It is certified that error appears in the above-identified patent and that said Letters Patent is hereby corrected as shown below:

In the Specification

In Column 11, Line(s) 51, delete "<cust id>" and insert --<cust_id>--, therefor.

In the Claims

In Column 21, Line(s) 29, Claim 2, after "claim 1", insert --,--.

In Column 21, Line(s) 32, Claim 3, after "claim 1", insert --,--.

In Column 21, Line(s) 34, Claim 4, after "claim 3", insert --,--.

In Column 21, Line(s) 38, Claim 5, after "claim 1", insert --,--.

In Column 21, Line(s) 50, Claim 7, after "claim 1", insert --,--.

In Column 21, Line(s) 54, Claim 8, after "claim 1", insert --,--.

In Column 21, Line(s) 57, Claim 9, after "claim 1", insert --,--.

In Column 22, Line(s) 18, Claim 11, after "claim 10", insert --,--.

In Column 22, Line(s) 21, Claim 12, after "claim 10", insert --,--.

In Column 22, Line(s) 23, Claim 13, after "claim 12", insert --,--.

In Column 22, Line(s) 27, Claim 14, after "claim 10", insert --,--.

Signed and Sealed this
Sixth Day of December, 2022

Katherine Kelly Vidal
*Director of the United States Patent and Trademark Office*

In Column 22, Line(s) 32, Claim 16, after "claim 10", insert --,--.

In Column 22, Line(s) 39, Claim 17, after "claim 10", insert --,--.